United States Patent

Cox

[11] Patent Number: 6,152,524
[45] Date of Patent: Nov. 28, 2000

[54] SADDLES FOR PEDAL-DRIVEN MACHINES

[76] Inventor: Brian Anthony Cox, The White House, Yarmouth Road, North Walsham, Norfolk NR28 9AT, United Kingdom

[21] Appl. No.: 09/308,091

[22] PCT Filed: Nov. 17, 1997

[86] PCT No.: PCT/GB97/03065

§ 371 Date: Jul. 16, 1999

§ 102(e) Date: Jul. 16, 1999

[87] PCT Pub. No.: WO98/22331

PCT Pub. Date: May 28, 1998

[30] Foreign Application Priority Data

Nov. 16, 1996 [GB] United Kingdom .................. 9623817

[51] Int. Cl.$^7$ ......................................................... B62J 1/00
[52] U.S. Cl. ...................... 297/201; 297/202; 297/215.1; 297/452.41
[58] Field of Search .................. 297/195.1, 201, 297/215.1, 202, 452.41, 452.21, 452.22, 452.26, 284.1, 284.3, 452.4, 452.39

[56] References Cited

U.S. PATENT DOCUMENTS

| 701,390 | 6/1902 | Provoost . |
| 1,350,987 | 8/1920 | Cherry . |
| 5,356,205 | 10/1994 | Calvert et al. . |
| 5,645,315 | 7/1997 | Walker et al. . |
| 5,670,232 | 9/1997 | Bigolin . |
| 5,863,094 | 1/1999 | Endo . |

FOREIGN PATENT DOCUMENTS

| 0 043 278 | 1/1982 | European Pat. Off. . |
| 0 091 016 | 10/1983 | European Pat. Off. . |
| 0 467 541 | 1/1992 | European Pat. Off. . |
| WO 93/04907 | 3/1993 | WIPO . |
| WO 94/25331 | 11/1994 | WIPO . |

*Primary Examiner*—Milton Nelson, Jr.
*Attorney, Agent, or Firm*—Synnestvedt & Lechner LLP

[57] ABSTRACT

A hornless saddle for a pedal-operated machine is disclosed, the saddle having an upwardly concave semi-circular shape including two adjacent quadrant-shaped planar surfaces for supporting a rider's buttocks. Each surface is bounded by upstanding embankments to the side and rear thereof which embrace and retain the rider's buttocks on the saddle. The saddle is capable of limited lateral pivotal movement about a fore and aft axis to accommodate and mimic the lateral rolling action of the rider's pelvis as the pedals are rotated.

11 Claims, 4 Drawing Sheets

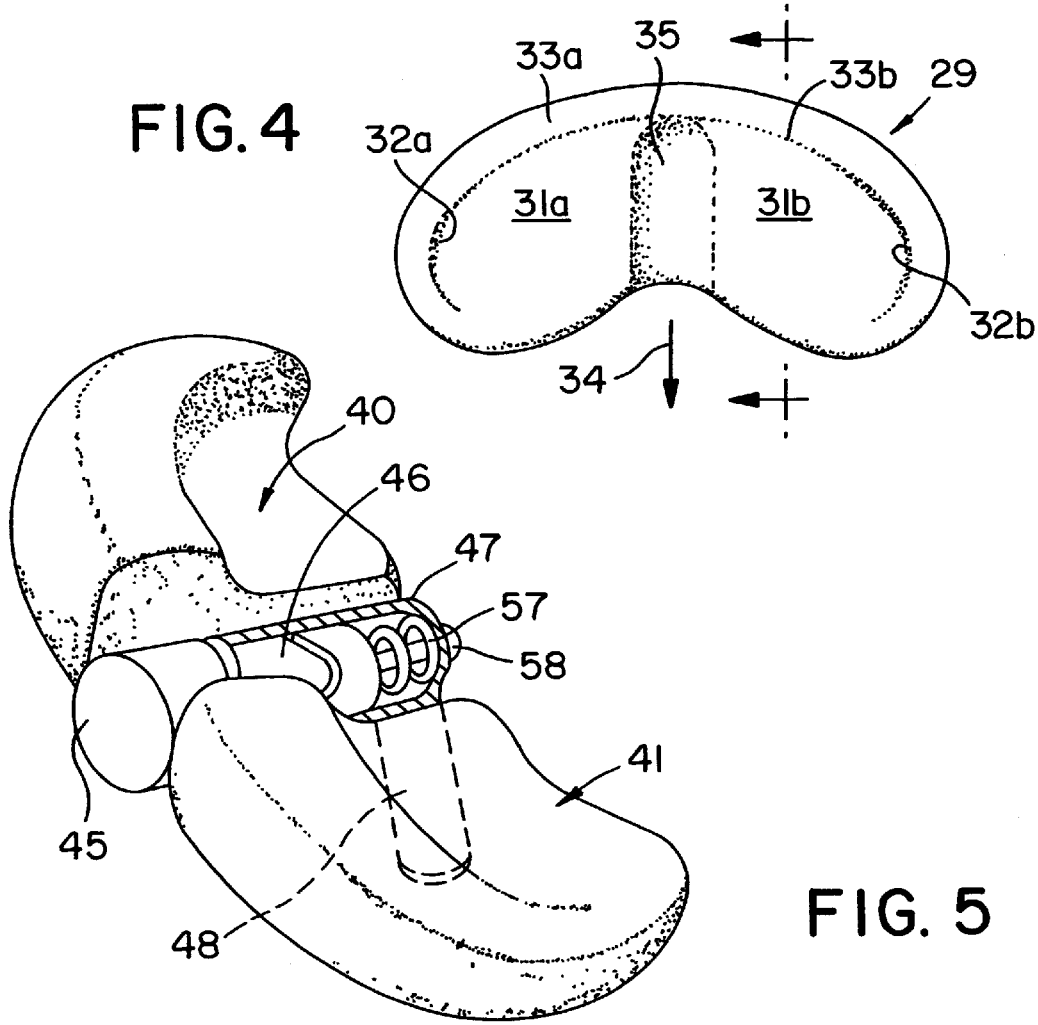
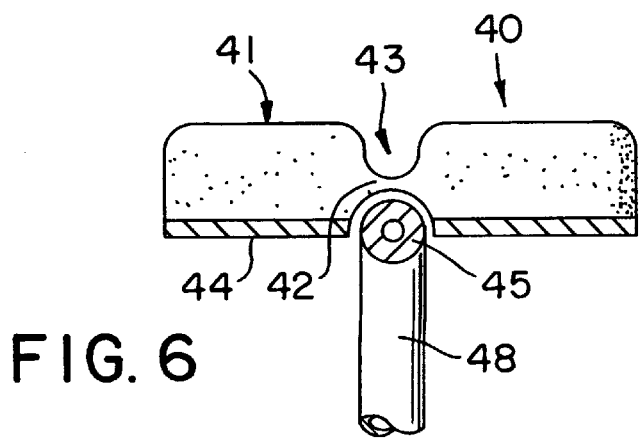

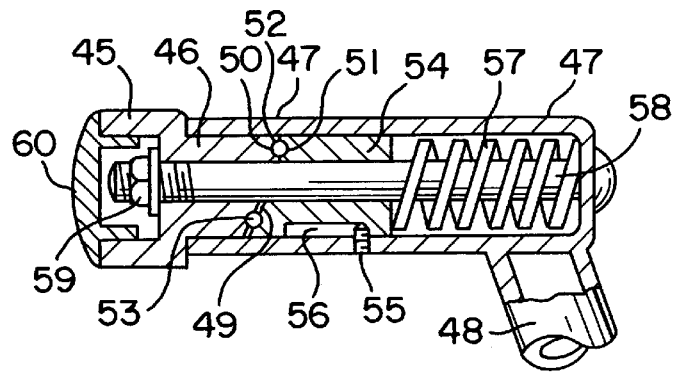
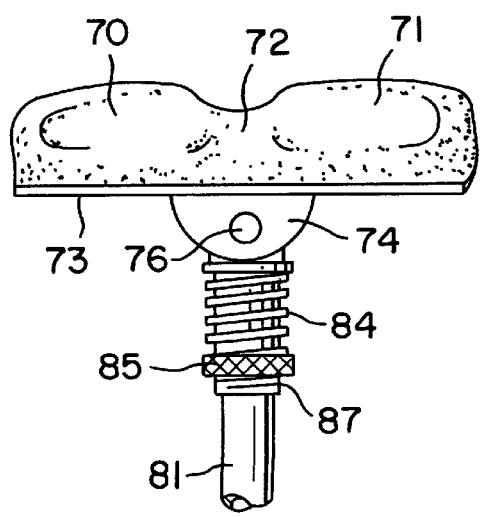
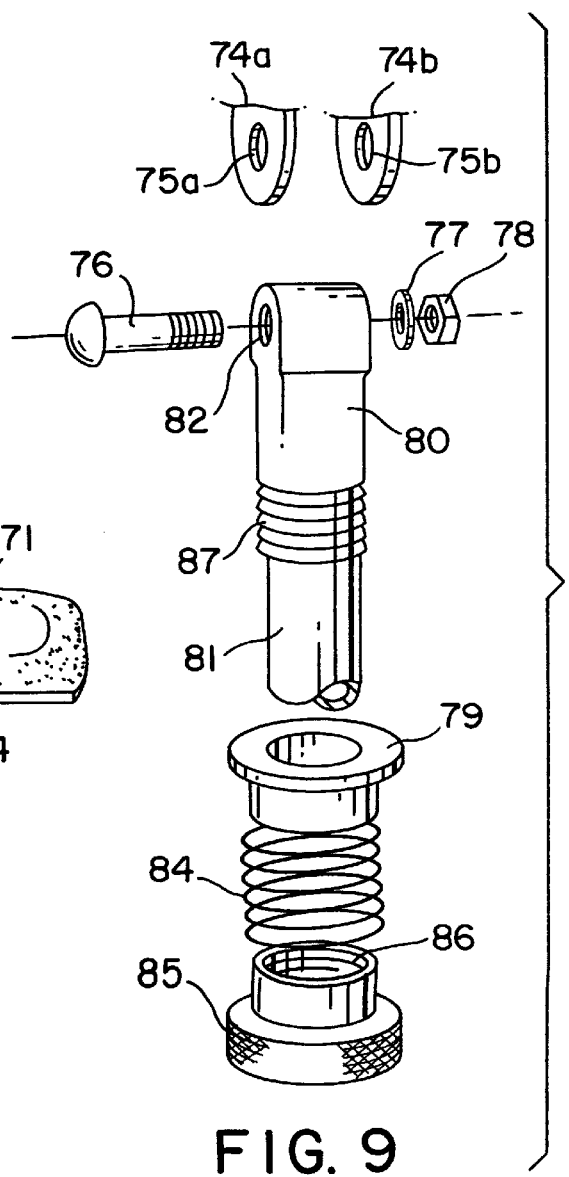

SADDLES FOR PEDAL-DRIVEN MACHINES

This invention relates to saddles for pedal-operated machines. It is more particularly concerned with hornless saddles for bicycles, tricycles and other pedal-driven vehicles, but it is of course equally relevant to pedal-operated exercise or other machines—all which are included, when the context so allows, in the term 'cycle' wherever that for convenience is used hereinafter.

Bicycles and like machines have been used for more than a hundred years, and have indeed achieved mass popularity world-wide. One might suppose that over so long a period more than one kind of saddle might have been devised to fulfil the necessary requirements. It has however been said that over the long period since bicycles were invented and first came into use there have been immense improvements in every aspect of the machine save only in the saddles, which in practice remain much as they were long, long ago.

The function of any cycle saddle must be to support the rider's weight on the cycle and to restrain the rider's seat against slipping off the saddle, while leaving his or her legs and feet free to rotate the pedals. No-one can know every form of saddle that has ever been devised for this purpose, but based upon experience of what is actually available it seems a safe generalisation to say that all conventional bicycle saddles have achieved these objectives by providing a rearward, generally-planar and relatively-broad buttock-adjacent platform, which merges into a single, forwardly-projecting, relatively-narrow upwardly-convex saddle horn. Where research has revealed any exceptions to that general rule they will be mentioned hereinafter, but it is certainly that kind of single-horned saddle which seems nowadays to be in universal use—and yet it has distinct drawbacks.

With the conventional single-horned saddle one supposes that the rider's weight ought to be carried wholly or at least mainly by the rider's buttocks on the relatively-broad rearward platform, and that the horn serves only to pass between the rider's legs and thereby prevent the rider from slipping off the saddle—but all too often in practice much or even virtually all of the weight is actually borne by the rider's crotch on the relatively-narrow, forwardly-projecting, upwardly-convex saddle horn. Sportsmen and other cycling enthusiasts should be aware that there are medical conditions which can arise from prolonged and excessive cycling on such conventional saddles, due to the pressure exerted on the rider's crotch when in contact with the horn of this conventional type of saddle.

There is indeed an essentially incurable medical condition known as chronic pressure neuropathy, from which competition cyclists and other cycling enthusiasts are liable to suffer, and which though not life-threatening is at best unpleasant and better avoided, while at worst its consequences can be socially unacceptable.

It is the object of this invention to address and so far as possible to solve this problem by providing an hornless cycle saddle, which will support the buttocks rather than the crotch of the rider and which because there is no forwardly-projecting horn passing between the rider's legs thus eliminates the danger of bruising to the nervous tissues and local blood-supply vessels and other associated, more long-term effects in the region of the rider's crotch, but which nevertheless is adapted to retain the rider's seat firmly in the saddle while leaving his or her legs free to rotate the pedals.

According to the present invention there is provided an hornless saddle for a pedal-operated cycle, which comprises an upwardly-concave, substantially semi-circular saddle including two adjacent generally quadrant-shaped, planar surfaces for supporting a rider's respective buttocks, said surfaces being each bounded at one or more points along its arcuate periphery by upstanding embankments arranged to the side and rear thereof so as to embrace and thereby retain the rider's buttocks in situ thereon, as well as means for mounting said saddle upon the cycle for lateral titling movement about an axis disposed fore-and-aft of the cycle so as to accommodate and mimic the lateral rolling action of the rider's pelvis as the pedals are rotated.

Since the cycle saddle of this invention is free from any forwardly-projecting, upwardly-convex horn that passes between the rider's legs it is to that extent already a great improvement medically-speaking over the conventional single-horned saddle design. In order still further to improve it in this respect, the saddle should not merely lack the forwardly-projecting horn of the conventional saddle but very preferably will be at least recessed and possibly separated along its centre-line, so that the respective quadrant-shaped buttock-supporting surfaces are spaced apart either side of the centre line of the saddle, thus leaving a sub-crotch channel therebetween in the region of the rider's crotch, and so to speak creating a bipartite saddle surface.

It is also preferred that the leading edge of the generally semi circular saddle should be indented, at least and especially adjacent the saddle's centre line, so that the outline of the pair of adjacent quadrant-shaped buttock-supporting surfaces is bicuspid or "kidney-shaped" in overall appearance, with its two lateral "wings" projecting further forward than its middle.

In these ways it is possible to ensure a complete absence of any saddle-structure which could contact the rider's crotch, and thereby cause damage to the nervous system and/or blood-supply vessels in that region. The sub-crotch channel and the bicuspid (or kidney-shaped) saddle-outline moreover both facilitate ventilation of a body-area otherwise notorious for heavy perspiration, and thereby contribute to cooling of the blood supply and thus an improvement in athletic efficiency.

The resultant hornless and bicuspid, upwardly-concave, buttock-supporting and embracing saddle of this invention can be strongly contrasted with the conventional, single-horned and approximately arrow-shaped, upwardly-convex, crotch-contacting saddles hitherto used, and it can easily be seen that the medical problems which can afflict cyclists are altogether avoided by adoption of this new form of hornless saddle. Moreover, while comfort is a subjective matter, those who have tested this new hornless saddle agree that it is very comfortable in use.

Of course, the mounting means for the saddle must include arrangements for attaching the whole saddle assembly, including both the quadrant-shaped buttock-supporting and -embracing surfaces of the hornless saddle, to the cycle frame, e.g. a saddle pillar. Whether fully separate or not, the two generally quadrant-shaped buttock-supporting surfaces will normally be both associated with a common base-member and mounted substantially side-by-side thereon. In turn, the base-member for the saddle assembly needs to be capable of attachment to the cycle frame, and of course most advantageously to a saddle-pillar of adjustable height associated with the cycle frame.

More than that the mounting means for the saddle assembly must however for the purposes of this invention also enable lateral tilting movement of the saddle assembly about an axis disposed fore-and-aft of the cycle, thus lying more or less substantially horizontally fore-and-aft in the plane of the cycle frame. The intention is that the common base-member with the associated quadrants should be capable of restricted rotation about this common axis to permit the saddle to tilt laterally, from one side to the other, so as to accommodate and mimic the rolling action of the rider's pelvis as the cycle pedals are rotated.

The greater the separation between the saddle assembly and the axis about which it tilts the greater the extent to which the saddle assembly will tend to shift from side to side as it tilts, and any such side-to-side shifting of the saddle should be kept as small as reasonably possible. Consequently it is a much preferred feature of this invention that the axis about which the saddle is able to tilt shall be arranged closely adjacent to the underside of the saddle assembly.

Because the intention is that the tilting of the saddle should so far as possible mimic the rolling action of the rider's pelvis, it is very desirable that the degree of tilting movement allowed to either side should be restricted to that which the rider's pelvis might require and bear. This is to some extent dependent on the physique of the individual rider—but as a generalisation it is believed that the degree of tilting permissible (either to one side or the other) should be in the range of from 10° to 25°, usually no more than 20°, and for most riders set at or about substantially 15°.

However, so as to cater for the physical characteristics of any individual rider, it is further preferred that the saddle mounting means shall also include tilt-adjustable stop device (s) whereby the maximum angle of tilt can be varied within limits to suit individual needs.

Unless provided with further means for preventing this, the saddle of this invention will tend to flop to one side or the other when not in use. This actually is of no disadvantage to the function of the saddle when in use, but those accustomed to the conventional kind of fixed saddle may find this unfamiliar and therefore disconcerting. Merely for that reason it is preferred that lateral tilting of the saddle either side of its normal horizontal attitude should be restrained by spring bias, preferably dampened, which bias therefore tends always to return the saddle to the horizontal.

The buttock-facing planar and/or upstanding embankment surfaces of the hornless saddle will very desirably be to a suitable degree flexibly resilient, so that they readily can and will conform themselves to the buttock-contours of any rider. Moreover the buttock-facing planar and/or upstanding embankment surfaces of the saddle should advantageously be (to a certain, appropriate extent) cushioned, so as to dampen vibration and jarring imparted by the roadway to the wheels of the pedal-driven cycle and then transmitted through its frame to the saddle.

These twin objectives can conveniently be attained by forming the hornless saddle so that its buttock-facing surfaces are flexibly resilient and supported by a cushioned seat-assembly carried by the saddle mounting arrangements. In one convenient form of construction the base-member is a rigid plate, bearing dependent attachment lugs via which it is mounted on the saddle pillar, and which rigid plate in turn carries the cushioned seat-assembly, which may be no more than a moulded, closed-pore foam or other spongy rubber or plastics material.

It may however be preferable if the cushioned seat-assembly comprises an upper, flexibly-resilient buttock-facing surface as well as a lower surface carried by the common base-plate, and between these upper and lower surfaces one or more fluid-filled void(s).

The void or voids in the cushioned seat assembly may, if desired be filled with pressurised gas, usually of course air, and if so a valve or valves akin to those provided on pneumatic cycle tires may be incorporated in the saddle. This arrangement has the advantage that the air-pressure within the voids can be readily adjusted by the rider to suit his or her preference, and indeed subsequently re-adjusted if desired. When using this kind of gas-pressurised saddle, it is usually preferable to insert an inflatable bladder within the saddle-void(s), and to pressurise that bladder rather than the saddle-void(s) proper.

On a balance of considerations (even recognising that one thereby sacrifices the possibility of pressure-adjustment to suit the rider's individual preference) it is however currently preferred to adopt an alternative arrangement which involves filling the void or voids with a constant-volume liquid-phase material, thereby avoiding any danger of pressure-loss during use, except of course in the event of damage so serious as to result in liquid-leakage.

When using a liquid-phase material to fill the void(s) the available choice of such liquid materials is almost limitless. However, while wishing the resiliently-flexible buttock-facing surfaces of the saddle to conform themselves reasonably quickly to changes in buttock-positioning and contour, a certain reluctance to conform instantaneously seems to enhance the cushioning effect. It is therefore preferred to employ semi-liquid, somewhat viscous and indeed gel-like materials within the void(s), such as are already known for use in cushioning of the conventional kind.

In a particularly preferred embodiment of this invention the two adjacent, generally quadrant-shaped buttock-supporting surfaces are each supported by fluid-pressure within one or more void(s) beneath that surface, all said voids containing a semi-liquid, viscous substantially-incomprehensible gel, able to equilibrate the pressures at all buttock-supporting and -embracing surfaces, and in which the respective void(s) beneath one buttock-supporting surface and the other buttock-supporting surface are interconnected via one or more duct(s) which will permit restricted flow of gel between one void and another, so that the respective surfaces are capable of alternate rising and falling action as the gel flows back and forth through the duct(s), according to the rider's attitude.

The invention also extends to pedal-operated cycles provided with one or more hornless, bicuspid saddle(s) as herein described.

In order that the invention may be more fully understood, some currently preferred embodiments thereof will now be described in more detail, though only by way of illustration, with reference to the accompanying schematic drawings, in which:

FIG. 4 is a plan view from above of the saddle shown in FIG. 3;

FIG. 5 is a perspective view (from above, the rear and one side) of a similar embodiment of hornless saddle; now including schematically-indicated means for supporting it upon the frame of a cycle;

FIG. 6 is an elevational view of the saddle-embodiment of FIG. 5, as seen in rear view;

FIG. 7 is a side-elevational view, partly cut-away and then in cross-section, of the saddle-supporting mechanism of the saddle-embodiment of FIGS. 5 and 6;

FIG. 8 is a perspective view, from the front and above, of a variant of the embodiment of FIGS. 5 to 7 above, using a different and rather less complex spring-biasing and damping arrangement; and FIG. 9 is an exploded view, on an enlarged scale, of the spring-biasing and damping arrangement of FIG. 8.

Figure 1:
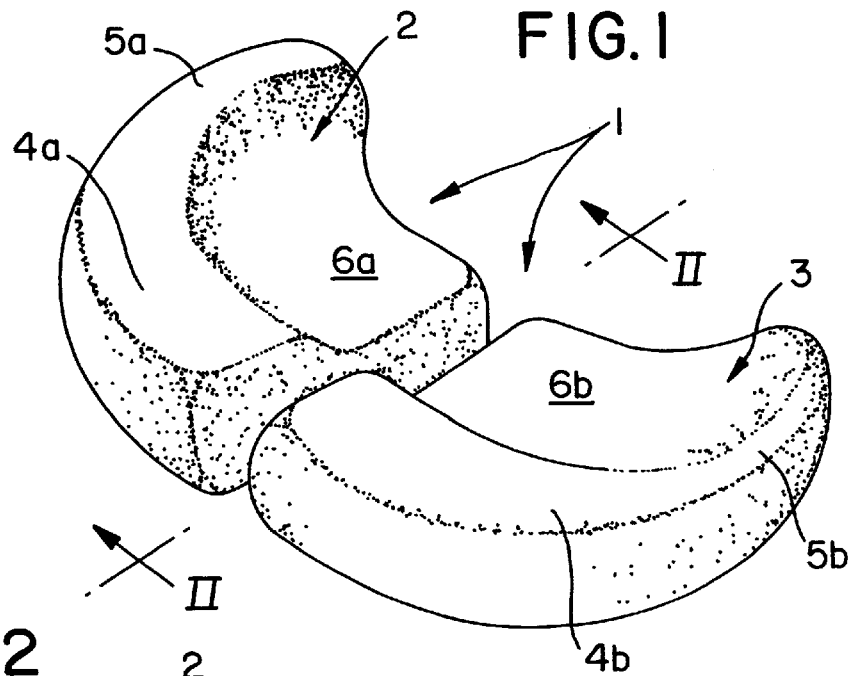
FIG. 1 is a perspective view (from above, the rear, and one side) of the two adjacent buttock-supporting and embracing quadrants of an hornless saddle.
Figure 2:
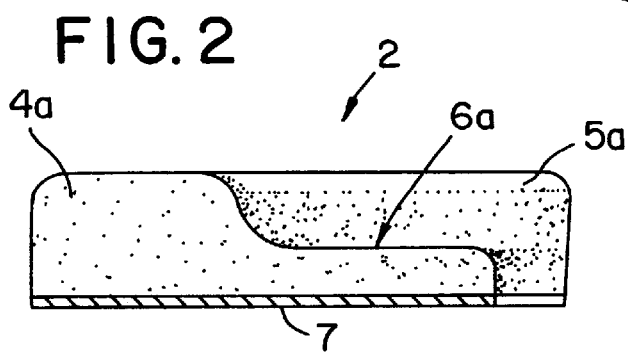
FIG. 2 is a side-elevational view, taken on the line II—II in FIG. 1, which more clearly (though still rather diagrammatically) shows the contours of the saddle.
Figure 3:
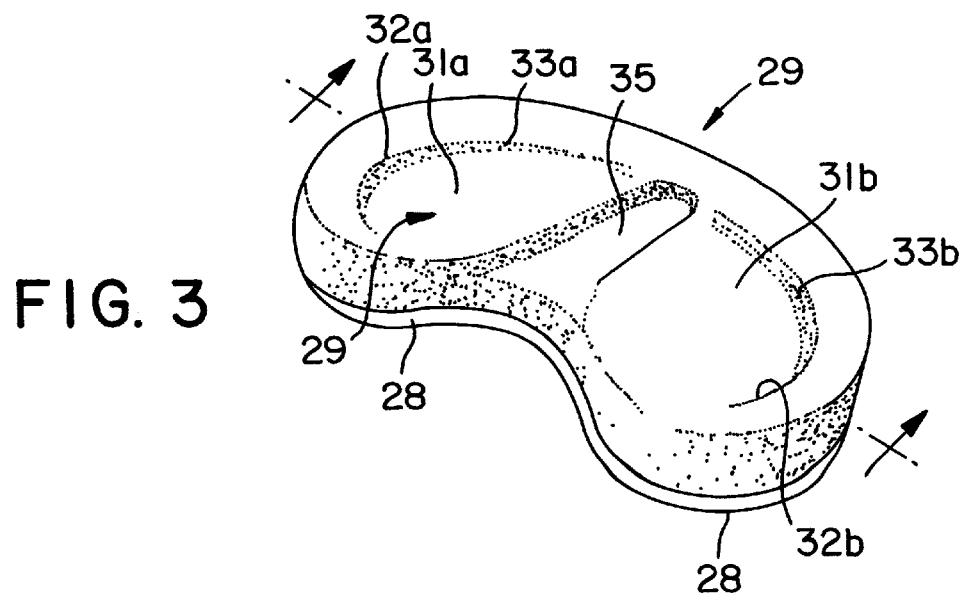
FIG. 3 is a perspective view (again from above and one side, but here instead also from the front) of a similar embodiment of hornless saddle.

Referring first to the embodiment of FIGS. 1 and 2, it will first be seen from FIG. 1 that the cycle saddle generally indicated 1 comprises a left-buttock supporting and embracing quadrant 2 and a right-buttock supporting and embracing quadrant 3, each the mirror-image of the other. Each of the quadrants 2 and 3 has an inclined rearward embankment, respectively 4a and 4b which merges arcuately into an inclined, lateral embankment, respectively 5a and 5b. These buttock-embracing embankments 4a, 5a and 4b, 5b surround and embrace the respective left- and right-buttocks (not shown) of a rider seated in the saddle and supported therein by the respective generally-horizontal buttock-support saddle-surfaces, 6a and 6b.

Alternatively the two of them jointly may be integrated into a single assembly, and then if desired the two quadrants may both have gel-filled cushioning voids inter-connected by one or more ducts, as will be subsequently described with reference to FIGS. 10 and 11 upon a generally-horizontal base plate 7.

The left-buttock quadrant 2 and the right-buttock quadrant 3 are similarly constructed, each of them the same image of the other. Each of them separately may be a gel-filled cushion, the left-buttock quadrant 2 is for simplicity formed of moulded, spongy foamed plastics material, mounted upon a generally-horizontal base plate 7.

Turning now to the alternative, second embodiment illustrated in FIGS. 5 to 7, it will be seen from FIG. 5 that a tubular saddle-pillar 21 (carried by the main cycle framework—not shown) is embraced by a tubular cap 22 having an upstanding, apertured attachment lug 23 arranged fore-and-aft (that is to say, in the plane of the cycle framework) across the top of the tubular cap 22, which is secured to the pillar 2 by means of a set-screw 24.

As best seen in FIG. 7, the lug 23 is interposed between two dependent apertured flanges 25, and the respective lug 23 and flanges 25 are rotatably interconnected by means of a bolt 26 which passes through the apertures in the respective lug and flanges, which bolt 26 is secured in place by a nut 27 that can be tightened up on the bolt to clamp the flanges 25 onto the lug 23 and thereby effect a firm, non-rotatable interconnection between them.

The flanges 25 depend from a generally-planar and essentially horizontal base-plate 28, which extends across the whole of the underside of the saddle proper, here generally indicated 29. Mounted upon the base plate 28 is the lower, generally-planar face 30 of the saddle 29 which comprises a right-hand-side buttock-supporting and -embracing quadrant 31a and a left-hand-side buttock-supporting and -embracing quadrant 31b, those quadrants being each bounded by respective inclined, inwardly-directed sloping surfaces 32a and 32b, which restrain a rider seated on the saddle from slipping off it sidewards in either one direction or the other. The saddle-cushion 29 is also bounded at the rear by similar, inwardly-directed sloping surface(s) 33a and 33b, which prevent the rider when seated on the saddle from sliding off it backwards, and moreover provide an abutment surface against which the rider's buttocks may press when the rider is working hard at pedalling the vehicle.

As seen best in FIGS. 5 and 6, the lateral quadrants respectively 31a and 31b of the saddle extend forwardly (i.e. in the forward direction of movement of the pedal-vehicle, as shown by arrow 34) thus giving the saddle, in plan view as best seen in FIG. 4, its characteristic bicuspid or "kidney" shape.

Intermediate the quadrants 31a and 31b and directly above the depending flanges 25 (which form the mounting bracket) the saddle is provided with a recessed, re-entrant channel, generally indicated 35, which is open at its forward end but closed off at its rearward end.

Referring again to FIGS. 5 to 7, it will be seen that FIG. 5 shows two saddle-quadrants 40 and 41, intended to support and embrace respectively the left-buttock and the right-buttock of any rider. The quadrants 40 and 41 are except as indicated below generally similar in construction to those described with reference to previously-mentioned embodiment. In FIG. 5 (merely for ease of illustration) there is no structure extending between the quadrants 40 and 41, but in fact as appears from FIG. 6, there is an interconnecting web 42 extending therebetween, at the bottom of the sub-crotch channel 43.

Both the quadrants 40 and 41 as well as the intervening web 42 are supported (see FIG. 6) on a base plate 44 which extends from side to side of both quadrants, but at its centre immediately beneath the web 42 and below the sub-crotch channel 43 is integrated with a rotatable end-cap 45 having a cylindrical stub-shaft 46 projecting therefrom, rotatably received within an housing 47 which in turn is mounted at the upper end of a saddle pillar 48.

As appears best from FIG. 7, the stub 46 has an inclined end surface 49, and at one point thereon a semi-circular depression 50 which receives half of a ball bearing 51. The other half of the ball bearing 51 runs in a circular or partcircular track 52 formed in the correspondingly-inclined, co-acting end-surface 53 of an axially-movable plug 54, movable within the housing 47 between limits established by a grub-screw 55 passing through the housing 47 and received within a longitudinally-extending slot 56 in the plug 54.

The end of the plug 54 remote from its inclined surface abuts within the housing against the end of a compression spring 57. The spring 57 is disposed around a retaining bolt 58 which passes axially through the housing, the movable plug 54 and the rotatable end-cap 45 and is there engaged with a nut 59, within a cavity closed off (merely for the sake of appearance) by a cover 60.

When the motion of a rider's pelvis and thus his buttocks seeks to depress one of the quadrants 40, 41 while permitting the other to rise, that lateral tilting motion (in whichever direction) rotates the base plate 44 and with it the end-cap 45, and this angular rotation is translated by the co-acting inclined surfaces 49 and 53 of the respective stub-shaft 46 and plug 54 and the intervening ball-bearing 50 into a linear movement in the axial direction of the plug 54 against the bias of the compression spring 57. This spring bias tends always to return the whole saddle to its normal, substantially horizontal altitude.

Referring now to the modified version shown in FIGS. 8 and 9, it will be seen that saddle quadrants 70 and 71 with an intervening web 72 are as before mounted upon a common base plate 73. However the base plate 73 in this modification is supported on a generally semi-circular, laterally-extending, dependent ear 74 (or, as better seen in FIG. 9, a pair of such ears 74a, 74b) having an eccentrically-located aperture 75 (or apertures 75a, 75b) therein, through which passes a bolt 76 which is threadedly-engaged via a washer 77 with a nut 78.

Due to the eccentric location of the aperture(s) 75 and bolt 76 & c., the circular periphery of the ear(s) 74 provides a camming surface which bears upon a flanged cylindrical axially-slidable collar 79 disposed around the upper stem-portion 80 of the saddle pillar 81 having at its upper end a transverse bore 82 through which the bolt 76 passes. The lower end of the slidable collar 79 engages a spiral spring 84 disposed around the stem-portion 80, and the other end of the compression spring 84 is engaged by an outwardly-knurled, internally threaded collar 85, at 86 for inter-engagement (and longitudinal adjustment) with a threaded section 87 provided on the saddle pillar 81 below the stem-portion 80. Much as in the embodiment of FIGS. 7–10, when the rolling action of any rider's pelvis causes the assembly to tilt either one way or the other, this results in rotation of the semi-circular ear(s) 74 about the eccentrically-located bolt 76 forcing the slidable collar 79 down against the bias of spring 84. Thus the spring 84 resists the tilting movement of the saddle, and seeks always to restore it to its normal horizontal attitude.

Figure 10:
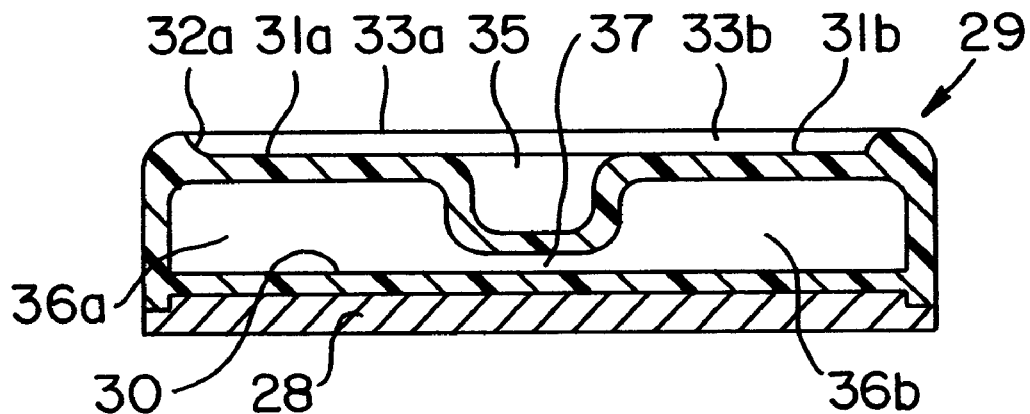
FIG. 10 is a cross-sectional view taken on the line X—X in FIG. 3, including the saddle attachment means therebelow.

Referring now to FIG. 10, it will be seen that the respective lateral and rearward buttock-embracing embankments 32a, 32b and 33a, 33b slope down to and half-surround generally-horizontal buttock-supporting quadrant surfaces 31a, 31b, the left-hand and right-hand portions of which are separated by the recessed channel 35. Beneath the right-hand quadrant 31a of the saddle there is a void 36a, and beneath the other, left-hand quadrant 31b there is a void 36b, each of them filled with a semi-liquid, rather viscous and substantially incompressible gel (not shown) capable of equilibrating pressure beneath and around the buttocks of the rider. Pressure is also equilibrated as between void 36a and void 36b via one or more inter-connecting duct(s) 37. The voids 36a, 36b and interconnecting duct(s) 37 are sealed off by means of the horizontal membrane 30, which in turn is supported on the horizontal base plate 28.

Figure 11:
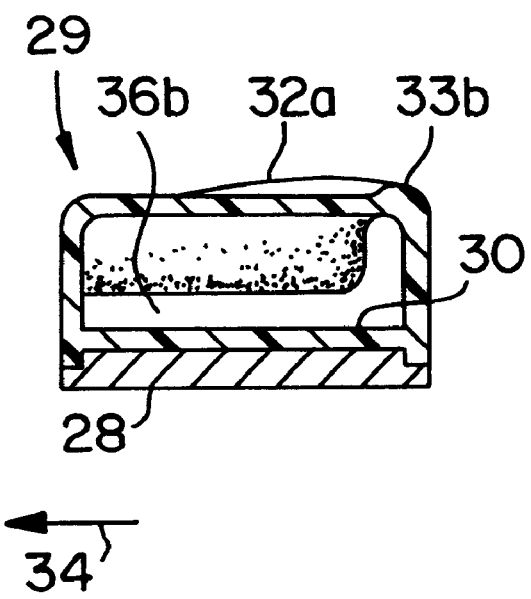
FIG. 11 is a view, partly in cross-section, taken on the line XI—XI in FIG. 4, which shows more clearly the attachment means by which the saddle is carried on the cycle framework.

The angle at which the saddle 29 is mounted upon the pillar can be adjusted, as best seen in FIG. 11, by loosening the nut 27 on the bolt 26 and then rotating the depending flanges 25 relative to the upstanding lug 23 until the desired saddle-attitude is achieved, and thereafter re-tightening the nut 27 on the bolt 26.

It will of course be understood that the preferred embodiment of hornless saddle as described above is capable of a variety of modifications. In particular the voids and interconnecting duct may be filled not with semi-liquid gel as suggested above but instead with compressed air, pumped in and/or released via a bicycle-type tire-valve, and therefore operable by a normal bicycle tire pump. Where the saddle is thus pressurised by compressed air, a further desirable modification will usually be to provide within the void(s) an inflatable bladder, akin to the kind of bladder employed inside a football or the like, and to pressurise that bladder rather than the saddle itself.

What is claimed is:

1. A hornless saddle for a pedal-operated machine, which comprises an upwardly-concave, substantially semicircular saddle including two adjacent generally quadrant-shaped, planar surfaces for supporting a rider's respective buttocks, said surfaces being each bounded at a plurality of points along its arcuate periphery by upstanding embankments arranged to the side and rear thereof so as to embrace and thereby retain the rider's buttocks in situ thereon, as well as means for mounting said saddle upon the pedal-operated machine for limited lateral pivotal movement about an axis disposed fore-and-aft of the pedal-operated machine so as to accommodate and mimic lateral rolling action of a rider's pelvis as the pedals are rotated.

2. A hornless saddle according to claim 1, in which the respective quadrant-shaped, buttock-supporting surfaces are spaced apart either side of but adjacent to the center line of the saddle, leaving a sub-crotch channel therebetween in the region of the rider's crotch.

3. A hornless saddle according to claim 1, in which the generally semicircular saddle is indented at least adjacent the saddle's center line so that the overall outline of the pair of buttock-supporting surfaces is bicuspid, having two lateral wings projecting further forward than its middle.

4. A hornless saddle according to claim 1, in which the buttock-supporting surfaces thereof are flexibly-resilient so as to conform to any rider's buttocks and cushioned so as to dampen vibration and jarring.

5. A hornless saddle according to claim 4, in which the two separate, generally quadrant-shaped buttock-supporting surfaces are each formed of flexibly-resilient material able to conform said surfaces to the buttock-contours of any rider, and each of said surfaces is supported by fluid-pressure within at least one void therebeneath, said voids containing a semi-liquid, viscous, substantially incompressible gel, able to equilibrate the pressures at all buttock-supporting and embracing surfaces, further including ducting interconnecting the void beneath one buttock-supporting surface and the void beneath the other buttock-supporting surface, said ducting permitting only restricted flow of gel therebetween, so that the respective surfaces are capable of alternate rising and falling action to accommodate varying attitudes of the rider's thighs.

6. A hornless saddle according to claim 1, wherein said pedal-operated machine has a frame and in which the two buttock-supporting surfaces are both associated with a common base-member and mounted substantially side-by-side thereon, said base member being in turn provided with means for attachment to a saddle-pillar of adjustable height secured to the frame of the pedal-operated machine.

7. A hornless saddle for a pedal-operated machine according to claim 6, in which the two generally quadrant-shaped buttock-supporting surfaces and the associated common base-member are mounted on a common tilt axis about which the saddle is capable of restricted rotation, said buttock-supporting surfaces being disposed substantially side—side adjacent to each other but one to each side of said tilt axis, the common tilt axis lying substantially fore-and-aft in the plane of a cycle frame and closely adjacent to the underside of the saddle.

8. A hornless saddle according to claim 7, in which the degree of tilting to either side permitted is in the range of from about 10° to about 25°.

9. A hornless saddle according to claim 8 in which the degree of tilting to either side permitted is about 15°.

10. A hornless saddle according to claim 7, which includes at least one tilt-adjustable stop device whereby the maximum angle of tilt can be varied.

11. A hornless saddle according to claim 7, further including a spring for restraining lateral tilting of the saddle, the spring biasing the saddle and tending to return it always to the horizontal.

* * * * *

UNITED STATES PATENT AND TRADEMARK OFFICE
CERTIFICATE OF CORRECTION

PATENT NO. : 6,152,524
DATED : November 28, 2000
INVENTOR(S) : Cox

It is certified that error appears in the above-identified patent and that said Letters Patent is hereby corrected as shown below:

Column 8,
Line 50, change "side--side" to -- side-by-side --.

Signed and Sealed this

Second Day of October, 2001

Attest:

*Nicholas P. Godici*

NICHOLAS P. GODICI
*Attesting Officer*   *Acting Director of the United States Patent and Trademark Office*